Aug. 10, 1937.  A. J. THOWLESS  2,089,230
ROCK DRILL
Filed Aug. 25, 1933  3 Sheets-Sheet 1
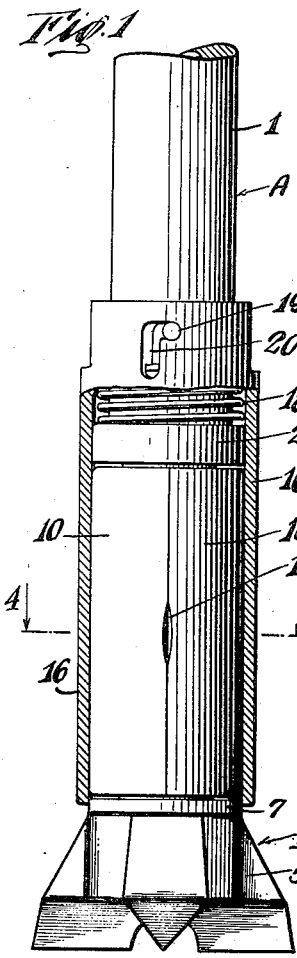
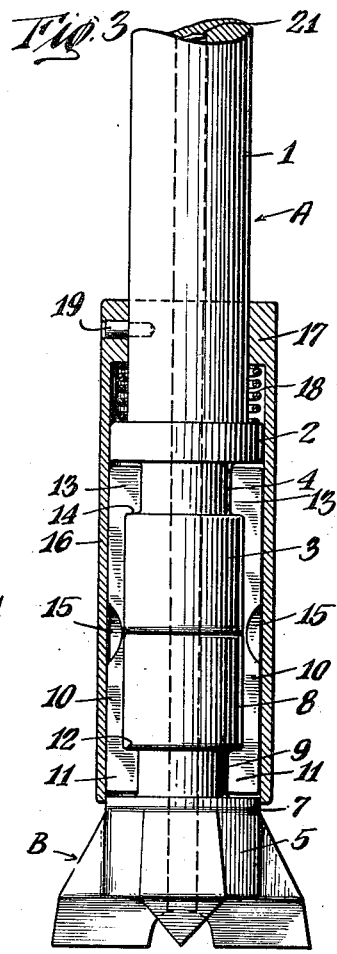
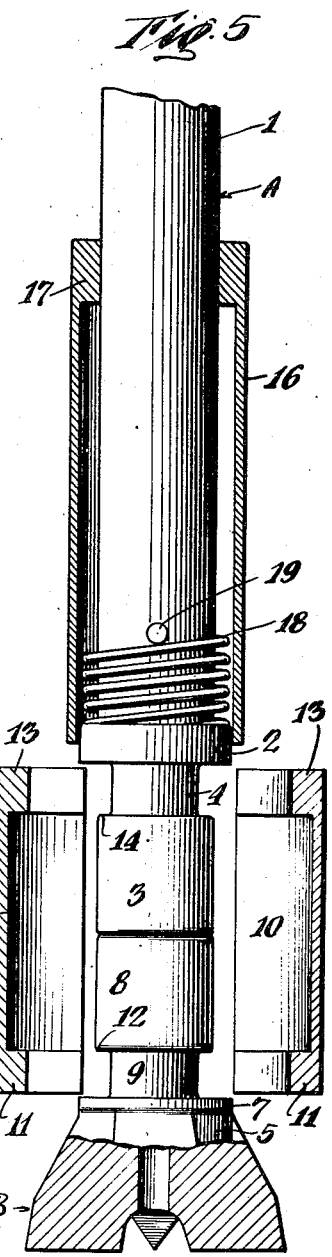
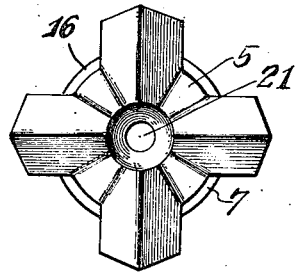
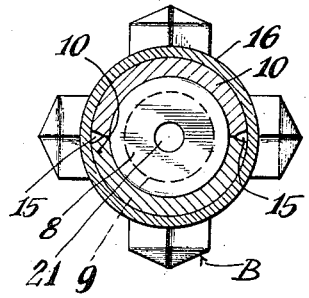
INVENTOR
Arthur J. Thowless
BY
Austin & Dix
ATTORNEYS Aug. 10, 1937.                A. J. THOWLESS                2,089,230
                               ROCK DRILL
                           Filed Aug. 25, 1933            3 Sheets-Sheet 2
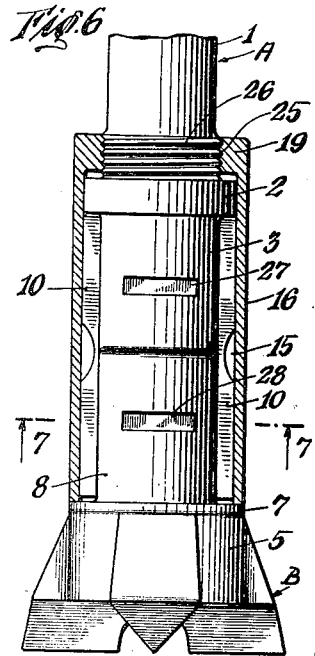
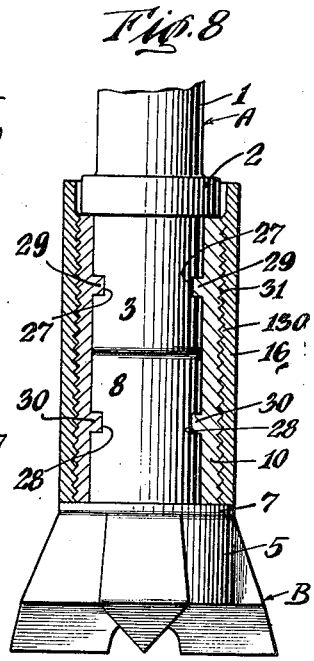
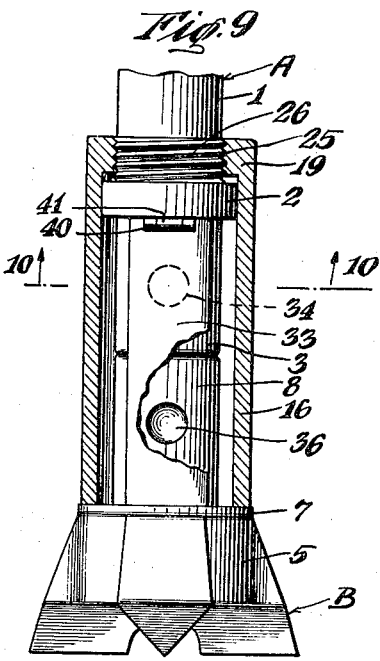
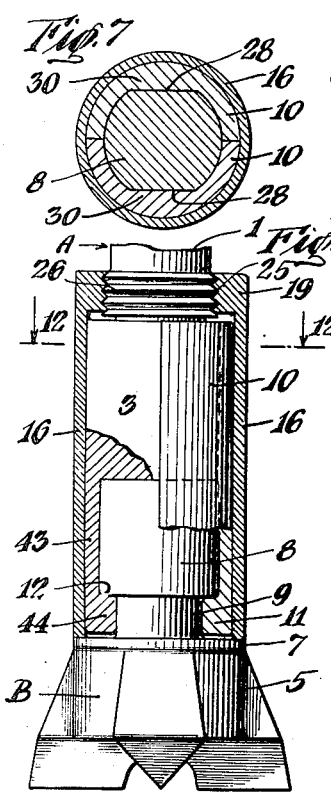
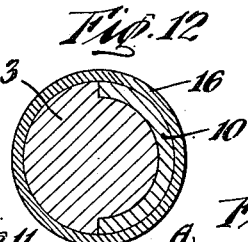
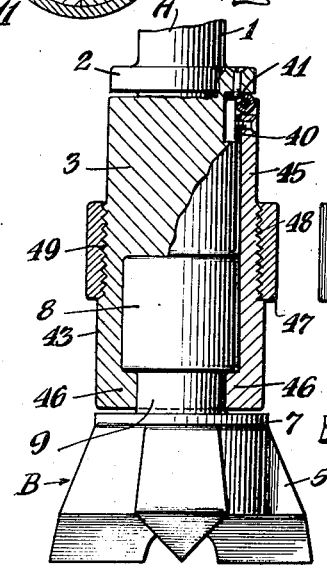
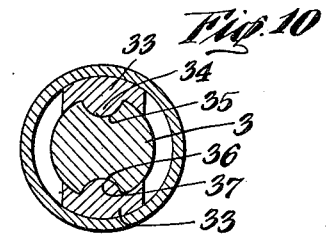
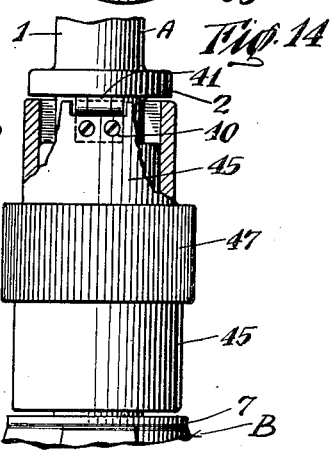
INVENTOR
Arthur J. Thowless
BY
Austin & Dix
ATTORNEYS Aug. 10, 1937.   A. J. THOWLESS   2,089,230
ROCK DRILL
Filed Aug. 25, 1933   3 Sheets-Sheet 3
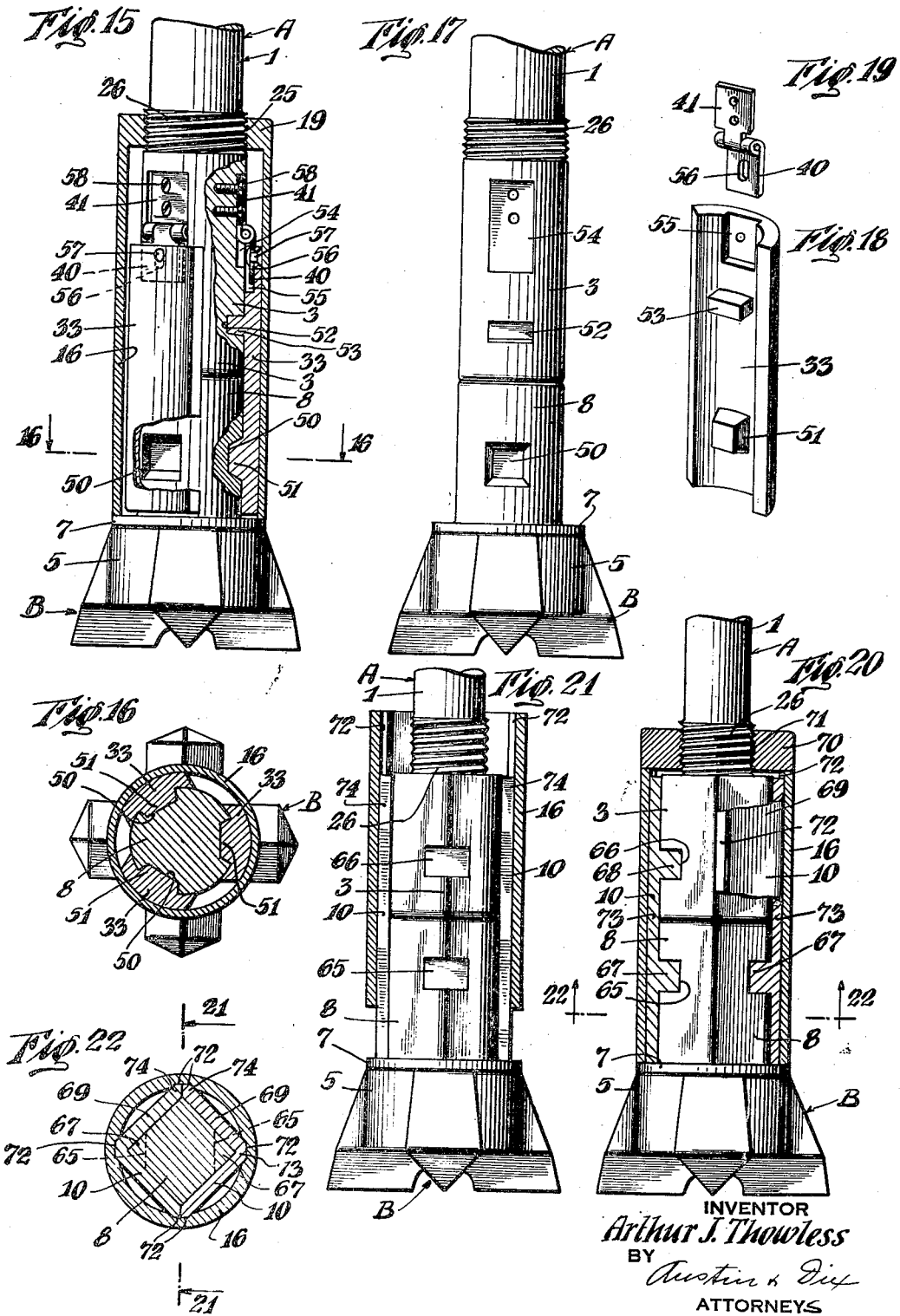
INVENTOR
Arthur J. Thowless
BY
Austin & Dix
ATTORNEYS Patented Aug. 10, 1937

2,089,230

UNITED STATES PATENT OFFICE 2,089,230

ROCK DRILL

Arthur J. Thowless, Newark, N. J.

Application August 25, 1933, Serial No. 686,677

6 Claims. (Cl. 255—64)

This invention relates to rock drills and more particularly to a rock drill having means associated therewith permitting attachment and detachment of the bit.

Rock drills are subjected to considerable shock incident to the drilling operation. In rock drills of the detachable drill bit type heretofore made, the shock from the drill bit is transferred indirectly to the drill shaft through the bit attaching device. For example, one type of detachable bit now in use is provided with a threaded shank which screws into a threaded sleeve connected to the drill stem. The shock incident to drilling is thus transferred to the threaded parts of the bit shank and sleeve with the result that the threads become so hammered and worn that it is difficult to remove the bit or replace the bit on to the drill stem. In addition to these defects much of the working force desired to be transferred to the drill bit is lost effort and does not perform effective work. Detachable bits as heretofore made have been unduly complicated and expensive and have required extensive machining and milling to manufacture them. The detaching devices heretofore used are otherwise complicated, difficult to manipulate and quickly wear out.

Drill bits also quickly wear out when operating on hard surfaces and must be replaced with a new bit. It is advantageous, therefore, to provide a drill bit which can be made as sturdy as possible and at a minimum of cost.

In accordance with this invention a drill stem and drill bit combination is provided wherein the shocks incident to drilling are transferred directly from the drill stem to the drill bit. The drill bit is strong and sturdy in construction and can be inexpensively made by a simple drop forging operation. The drill shank abuts directly against the broad end of the drill stem and is held thereto by simple attaching devices which securely hold the drill bit to the drill stem. The connecting device comprises one or more separable members provided with parts which engage and interfit with corresponding locking parts provided on the drill stem and drill bit. The connecting members are held in place by a sleeve or ring which telescopes over the member. The connecting devices are not effected by the shocks incident to drilling and as a result may be made of relatively light material. The drill bit may be easily and quickly attached and detached by an unskilled operator.

An object of this invention is to provide a detachable drill stem and drill bit combination in which the shocks incident to drilling are transferred from the drill stem directly to the drill bit.

Another object of this invention is to provide means which may be easily and quickly manipulated by an unskilled operator to attach and detach the drill bit and drill stem.

Another object of this invention is to provide a detachable drill bit which is strong and durable and which may be made at a minimum cost.

Still another object of this invention is to provide adjustable means for securely holding the detachable drill bit to the drill stem which is composed of few parts, inexpensive to manufacture, which securely holds the bit in position during operation, and which may be easily and quickly manipulated by an unskilled operator when attachment or detachment of the drill bit is desired.

Other objects of this invention will become apparent as the disclosure proceeds.

In order that a clearer understanding of my invention may be had, attention is hereby directed to the accompanying drawings, forming a part of this application and illustrating certain possible embodiments of my invention.

Referring to the drawings,

Fig. 1 is a side view of my detachable bit and drill stem combination, certain parts of the connecting means being broken away to illustrate certain features of the construction;

Fig. 2 is an end view of the drill bit shown in Fig. 1;

Fig. 3 is a side view of the detachable drill bit and drill stem combination shown in Fig. 1, the drill bit attaching means being shown in vertical cross section;

Fig. 4 is a horizontal cross sectional view through the rock drill taken on line 4—4 of Fig. 1;

Fig. 5 is an exploded view of the detachable rock drill bit and drill stem combination, showing more particularly the construction and method of attachment and detachment of the securing devices;

Fig. 6 is a side view of a detachable rock bit and drill stem combination of modified construction, modified means being shown for attaching the drill bit to the drill stem;

Fig. 7 is a horizontal cross sectional view through the drill bit and associated attaching means, taken on line 7—7 of Fig. 6;

Fig. 8 is another side view of the drill bit and drill stem combination shown in Fig. 6, further modified means being shown for detaching and connecting the drill bit to the drill stem;

Fig. 9 is a side view of a further modification of the drill bit and drill stem and associated securing devices;

Fig. 10 is a horizontal cross sectional view through the drill stem and securing devices shown in Fig. 9, this view being taken on line 10—10 of Fig. 9;

Fig. 11 is a side view of a modified form of drill stem showing a modified form of drill bit attaching means adapted for this type of construction;

Fig. 12 is a horizontal cross sectional view through the drill stem and associated securing means shown in Fig. 11, this view being taken on line 12—12 of Fig. 11;

Fig. 13 is a side view of a drill stem of the type shown in Fig. 11 having drill bit attaching means associated therewith of modified form;

Fig. 14 is another side view of the drill stem and associated drill bit shown in Fig. 13;

Fig. 15 is a side view of a drill stem and drill bit combination having a plurality of hinged members associated therewith for securing the drill bit to the drill stem;

Fig. 16 is a horizontal cross sectional view through the drill bit and associated attaching devices shown in Fig. 15, this view being taken on line 16—16 of Fig. 15;

Fig. 17 is a side view of the drill stem and drill bit shown in Fig. 15 with the attaching devices removed;

Fig. 18 is a perspective view of one of the hinged members comprising the drill bit locking devices shown in Fig. 15;

Fig. 19 is a perspective view of the hinge shown in Fig. 15 which is attached to the drill stem and the locking member, as shown in Fig. 15.

Fig. 20 shows a drill bit and drill stem combination of polygonal cross section having suitable securing devices associated therewith, the securing devices being shown broken away and in cross section to illustrate the construction;

Fig. 21 is a side view of the drill stem and drill bit combination with the attaching sleeve removed from its seating position; and Fig. 22 is a horizontal cross sectional view through the drill bit and associated securing devices shown in Fig. 22, this view being taken on line 22—22 of Fig. 20.

Similar reference characters refer to similar parts throughout the several views of the specification.

There is shown in Figs. 1 to 5, inclusive, a rock drill stem A and a detachable drill bit B. The drill stem A is reciprocated by suitable driving mechanism, well known in the art, so as to deliver hammer-like blows to the drill bit B. The drill stem A comprises a stem portion 1 having a collar 2 and a head portion 3 connected to the stem 1 by the reduced neck portion 4. The drill bit B comprises a body portion 5 having a plurality of cutting blades 6 at the operating end thereof. The drill bit is provided with a shank comprising a shoulder portion 7, a bit head 8 and connecting neck portion 9. The drill head 3 and the bit head 8 are in close seating abutment and are provided with broad surfaces so that the blows from the drill head 3 are delivered directly to the head 8 of the drill bit.

Suitable securing devices are used to secure the drill bit to the drill stem. As shown more particularly in Figs. 1, 3 and 5, a split sleeve comprising half portions 10 is provided which snugly fits and surrounds the head portions 3 and 8 of the drill stem and drill bit respectively. The half portions 10 are each provided with a projecting portion or shoulder 11 which closely fits around the neck portion 9 of the drill bit and abuts against the corresponding shoulder portion 12 of the bit head 8. The other end of the half portions 10 is also provided with a projection or shoulder portion 13 which snugly fits around the neck 4 of the drill stem and abuts against the shoulder portion 14 of the drill head 3. When the half portions 10 are applied to the drill stem and drill bit, as shown more particularly in Fig. 1, the bit head 8 and drill head 3 are held in fixed seating abutment.

A suitable notch 15 may be provided between the half portions 10 into which an implement may be inserted to separate the same. The half portions 10 are held in locked position by means of a tubular sleeve 16 which snugly telescopes thereover. A compression spring 18 which rests upon the shoulder portion 2 of the drill stem abuts against a collar portion 17 provided on the upper end of the sleeve 16, and by its action facilitates telescoping removal of the sleeve from its locked position. A locking device, comprising a stud 19 which projects from the drill stem 1 and extends into a bayonet slot 20, shown in Fig. 1, may be provided to lock the tubular sleeve in telescoping position over the connecting half portions 10. When the sleeve 16 is rotated a slight amount from its position, as shown in Fig. 1, the pin 19 will enter the longitudinal portion of the slot, and the compression spring 18 will assist in the removal of the sleeve from its telescoped position with respect to the connecting half portions 10. The half portions 10 can then be removed and the drill bit B detached.

Drill bits require frequent sharpening and must often be replaced with fresh bits. The securing devices as above described may be easily and quickly manipulated by the unskilled workman to permit ready detachment and attachment of the drill bit. The drill stem A delivers directly the successive impacts or blows to the head 8 of the drill bit as the drilling operation proceeds. A small passage 21 extends through the entire length of the drill stem and the drill bit and provides means through which suitable fluid, such as compressed air, water, oil or rock disintegrating chemical may be poured to facilitate the drilling. It will be noted that the shocks or blows incident to drilling are delivered directly from the drill stem A to the drill bit B and substantially no strain or shock is placed upon the drill bit connecting device comprising the half portion 10 and the tubular telescoping sleeve 16. Their only function is to support and hold the drill bit B in fixed abutment against the drill head 3 of the drill stem 1.

I have shown more particularly in Figs. 6, 7 and 8 a slightly modified form of drill head 3 and bit head 8. In this form the drill head 3 is provided with one or more horizontally extending slots 27 which receive corresponding projections 29 extending from the half portions 10. Similarly, the bit head 8 is provided with one or more horizontally extending slots 28 which receive corresponding projections 30 extending from the half portions 10. When the half portions 10 provided with the projections 29 and 30 are applied and seated within the corresponding recesses 27 provided in the drill head 3 and the corresponding recesses 28 provided in the bit head 8, the drill bit is securely held and locked to the drill stem 1 when the tubular sleeve 16 is applied. By referring more particularly to Fig. 7, it will be noted that in this type of locking device the drill head B is held firmly to the drill stem and cannot rotate.

There is shown in Figs. 6, 9, 11 and 15 a modified means for securing the sleeve 16 in operative position. In this form the drill stem 1 is provided with a threaded portion 26 on to which the threads 25 provided on the collar 19 of the tubular sleeve 16 may be screwed. This is an inexpensive type of construction and under certain instances may be preferred over the securing sleeve locking means shown in Figs. 1 to 5, inclusive.

As a further modification there is shown in Fig. 8 a tubular sleeve 16, the inner surface of which is provided with threads 30 which are adapted to screw over threads 31 provided on the outer surface of the half portions 10.

Under certain circumstances objection to the use of the separable half portions 10 shown in Figs. 1 to 8, inclusive, may be raised on the ground that the parts can be dropped or lost during attachment or detachment of the drill bit. To overcome this objection a modified form of drill bit connecting means, as shown in Figs. 9 and 10, may be provided, which comprises members 33 which are hinged at the upper end thereof to the collar portion 2 of the drill stem 1. Any suitable form of hinge may be provided for the purpose, as for example, a leaf hinge, one leaf 40 of which is secured to the connecting member 33 and the outer leaf 41 to the shoulder portion 2. One or more members 33 may be provided, as shown in Fig. 10, which need extend only partially around the circumferential area of the drill head 3 and the bit head 8. Where the hinge type of connection is used, rounded projecting portions 34 and 37 extending from the members 33 are preferably provided to facilitate entry into the corresponding sunken recesses 35 and 36 provided respectively in the drill head 3 and the bit head 8. The tubular sleeve 16 telescopes over the hinged members 33 as before and retains the same in locked position with respect to the drill head and drill stem.

If desired, drill bit connecting means may be provided which comprises only one removable half portion 10, as shown in Fig. 11. In this type of construction the drill head 3 is provided with a downwardly projecting flange 43 formed integral therewith and provided with a shoulder portion 44 which seats against the shoulder 12 of the bit head 8. The shoulder portion 44 of the flange 43 corresponds respectively to the shoulder portion 11 of the half portion 10. The drill bit B is removed by unscrewing the threaded portion 19 of the sleeve 16, lifting the sleeve from its telescoping position over the half portion 10, removing the half portion 10 and lifting the drill head 8 of the drill bit B from its seating position within the retaining flange 43. In this type of construction it is only necessary to manipulate one half portion 10 to remove or replace the drill bit.

Fig. 13 shows a drill stem of the type shown in Fig. 11 but having associated therewith a hinged locking member 45 of the general type shown in Fig. 9. The hinged locking member 45 is connected to the shoulder portion 2 by means of a hinge, one leaf 40 of which is secured to the locking member 45 and the other leaf 41 to the shoulder portion 2. The locking member 45 may comprise a half portion as shown in Fig. 14 or less than a half portion as shown more particularly in Figs. 9 and 10. The locking member 45 is provided with a shoulder portion 46 at the free end thereof which snugly fits around the neck portion 9 of the drill bit B.

As shown more particularly in Figs. 13 and 14, a modified form of tubular sleeve 47 may be provided which comprises a tubular band or ring which extends only partially over the associated drill bit connecting members. The ring member 47 may be provided with threads 48 which are adapted to screw over threads 49 provided on the outside surface of the connecting means comprising the locking member 45 and the locking flange 43.

A further modified form of drill bit connecting means is shown in Figs. 15 to 19, inclusive. There is here shown three connecting members 33 each provided with studs 51 which fit within pockets 50 provided in the bit head 8 and studs or projections 53 which fit within pockets 52 provided in the drill head 3. The connecting members 33 are attached to the drill head 3 by means of a hinge shown more particularly in Fig. 19. In order to permit the connecting members 33 to fit snugly around the bit head 8 and the drill head 3, I prefer to provide a recess 54 in the drill head which receives the hinge leaf 41 and a recess 55 on the inside face of the connecting member 33 which receives the hinge leaf 40, as shown more particularly in Fig. 15. Machine screws 58 or other suitable means are used to connect the hinge leaf 41 to the drill head 3. The hinge leaf 40 is provided with an elongated slot 56 which receives a stud 57 projecting from the recess portion 55 of the connecting member 33. The stud 57 permanently holds the connecting member 33 in hinged position but the slot 56 permits vertical adjustment or movement of the connecting member 33 with respect to the drill head 3 and the bit head 8. It is thus seen that this vertical adjustment of the connecting members 33 permits the stud portions 51 and 53 to lock themselves within the corresponding pockets 50 and 52 provided respectively on the bit head and the drill head. When thus attached the drill bit is held in proper connected position to the drill stem entirely through the agency of the projecting studs 51 and 53, leaving the hinge free from strain. The projecting studs 51 and 53 are shaped so as to facilitate their entry into the corresponding pockets 50 and 52 provided respectively in the bit head and drill head. The connecting members 33 may completely surround the drill head 3 and the bit head 8, or only partially surround the same in the manner shown more particularly in Fig. 16.

There is shown in Figs. 20 to 22, inclusive, a drill head 3 and bit head 8 of polygonal cross section. The half portions 10 snugly fit around the polygonal drill head and bit head and accordingly are provided with flat sides 69. This construction prevents possible turning of the drill bit. The drill head 3 and the bit head 8 may be provided with horizontal slots 65 and 66 respectively which receive corresponding projections 67 and 68 extending from the half portions 10. The projections 67 and 68 further assist in preventing turning or rotating movement of the drill bit when in operative position.

The tubular sleeve 16 is provided with a plurality of trackways 72 within which the corners 73 and the edges 74 of the half portions 10 slide. Thus the half portions 10 contact the inside surface of the tubular sleeve 16 at few points only. This type of construction is advantageous where the sleeve 16 is inclined to rust or stick to the half portions, making it difficult to remove the same. Since the sleeve contacts the half portions at few points only, the friction between these parts, which resists removal of the sleeve, is greatly reduced.

As a possible further modification, the tubular sleeve 16 may be held in telescoped position over the half portions 10 by means of a nut 70, shown more particularly in Fig. 20. The nut 70 seats over the sleeve 16 and is provided with threads 71 which engage threads 26 provided on the drill stem 1.

The various locking projections 11 and 12 shown in Figs. 3 and 5, projections 29 and 30 shown in Fig. 8, projections 33 and 37 shown in Figs. 9 and 10, projections 44 shown in Fig. 11, projections 51 and 53 shown in Figs. 15 and 18, and projections 67 and 68 shown in Fig. 20, may be of any desired and convenient shape or form. It is further understood that these projections may be formed either on the movable connecting devices as shown, or they may be formed directly on the bit shank and drill stem, in which case the corresponding receiving sockets would be formed on the movable connecting means. Various modifications may be thus made both as to the shape and position of the locking projections and associated receiving pockets.

It is understood that the various parts and details above described and disclosed in the accompanying drawings may be used in various different combinations within the purview of this invention. By way of example only, there are shown in Figs. 1, 6, 8, 13 and 20, different forms of tubular sleeves and associated means for locking the sleeves in position. These various types of sleeves may be used interchangeably with the various types of drill stems, as shown in Figs. 1, 6, 9, 11, 13, 15 and 21. Similarly, the various connecting devices, as shown in Figs. 1, 6, 9, 11, 13, 15 and 21, may be used interchangeably and in combination with the different types of tubular sleeves and drill stems as above described. While detachable drill bit and drill stem combinations herein disclosed are all effective, practical and inexpensive to make, it will be understood that certain types herein shown may be more effective and more practical for certain conditions than others. In all the forms the drill bit B may be inexpensively made by a simple drop forging operation, no machine work of any kind thereon being required. The drill stem, which is a permanent part of the drilling equipment, carries and supports the connecting mechanism which is a permanent part of the fixture. The shock incident to drilling is transferred directly from the drill stem to the drill bit, thus maximum efficiency is attained with a minimum of wear and tear on the parts.

The connecting means herein disclosed may also be associated with rock automatic hammers and similar devices. Where the expression "rock drill" is herein used, therefore, it is understood to imply and encompass automatic hammers and similar devices.

While certain novel features of the invention have been disclosed and are pointed out in the annexed claims, it will be understood that various omissions, substitutions and changes may be made by those skilled in the art without departing from the spirit of the invention.

What is claimed, is:

1. In a rock drill apparatus, the combination of a drill stem and detachable bit associated therewith, the drill stem and bit each being provided with a shoulder portion, a head portion and a reduced portion therebetween, means for operatively connecting the drill stem and bit with the head portions thereof in seated abutment, comprising a threadless cylindrical shaped split sleeve of uniform diameter formed of two similar separable portions, each of said portions being formed with an inwardly projecting peripheral flange at the ends thereof adapted to seat in the reduced portions between the shoulder and head portions of the drill stem and bit, and means to retain the split sleeve in the operative connecting portion comprising a tubular member slidably mounted upon the drill stem and adapted to telescope the half portions forming said sleeve.

2. In a rock drill apparatus, the combination of a drill stem and detachable bit associated therewith, the drill stem and bit being provided with a shoulder portion, a head portion and a reduced portion therebetween, means for operatively connecting the drill stem and bit with the head portions thereof in seated abutment, comprising a threadless tubular split sleeve of uniform diameter formed of a plurality of separable portions, each of said portions being formed with an inwardly projecting peripheral flange at the ends thereof adapted to seat in the reduced portions between the shoulder and head portions of the drill stem and bit, the external diameter of said sleeve being substantially the same as the diameter of the drill stem and bit shoulder portions and forming a substantially continuous surface therewith, and means to retain the split sleeve in the operative connecting position comprising a tubular member slidably mounted upon the drill stem and adapted to telescope the separable portions forming said sleeve.

3. In a rock drill apparatus, the combination of a drill stem and detachable bit associated therewith, the drill stem and bit each being provided with a shoulder portion, a head portion and a reduced portion therebetween, means for operatively connecting the drill stem and bit with the head portions thereof in seated abutment, comprising a threadless cylindrical shaped split sleeve formed of two similar separable portions, each of said portions being formed with an inwardly projecting peripheral flange at the ends thereof adapted to seat in the reduced portions between the shoulder and head portions of the drill stem and bit, the external diameter of said sleeve being substantially the same as the diameter of the drill stem and bit shoulder portions and forming a substantially continuous cylindrical surface therewith, and means to retain the split sleeve in the operative connecting position comprising a tubular member slidably mounted upon the drill stem and adapted to telescope said shoulder portions and the half portions forming said sleeve.

4. In a rock drill apparatus, the combination of a drill stem and detachable bit associated therewith, the drill stem and bit each being provided with a shoulder portion, a head portion and a reduced portion therebetween, means for operatively connecting the drill stem and bit with the head portions thereof in seated abutment, comprising a threadless cylindrical shaped split sleeve of uniform diameter formed of two similar separable portions, each of said portions being formed with an inwardly projecting peripheral flange at the ends thereof adapted to seat in the reduced portions between the shoulder and head portions of the drill stem and bit, means to retain the split sleeve in the operative connecting position comprising a tubular member slidably mounted upon the drill stem and adapted to telescope the half portions forming said sleeve and means, including a pin attached to the drill stem and slot formed in the tubular member adapted to cooperate with the pin, for securing said member in fixed telescoped position.

5. In a rock drill apparatus, the combination of a drill stem and detachable bit associated therewith, the drill stem and bit being provided with a shoulder portion, a head portion and a reduced portion therebetween, means for operatively connecting the drill stem and bit with the head portions thereof in seated abutment, comprising a threadless tubular split sleeve of uniform diameter formed of a plurality of separable portions, each of said portions being formed with an inwardly projecting peripheral flange at the ends thereof adapted to seat in the reduced portions between the shoulder and head portions of the drill stem and bit, the external diameter of said sleeve being substantially the same as the diameter of the drill stem and bit shoulder portions and forming a substantially continuous surface therewith, means to retain the split sleeve in the operative connecting position comprising a tubular member slidably mounted upon the drill stem and adapted to telescope the separable portions forming said sleeve, and means, including a pin attached to the drill stem and slot formed in the tubular member adapted to cooperate with the pin, for securing said member in fixed telescoped position.

6. In a rock drill apparatus, the combination of a drill stem and detachable bit associated therewith, the drill stem and bit each being provided with a shoulder portion, a head portion and a reduced portion therebetween, means for operatively connecting the drill stem and bit with the head portions thereof in seated abutment, comprising a threadless cylindrical shaped split sleeve formed of two similar separable portions, each of said portions being formed with an inwardly projecting peripheral flange at the ends thereof adapted to seat in the reduced portions between the shoulder and head portions of the drill stem and bit, the external diameter of said sleeve being substantially the same as the diameter of the drill stem and bit shoulder portions and forming a substantially continuous cylindrical surface therewith, means to retain the split sleeve in the operative connecting position comprising a tubular member slidably mounted upon the drill stem and adapted to telescope said shoulder portions and the half portions forming said sleeve, and means, including a pin attached to the drill stem and slot formed in the tubular member adapted to cooperate with the pin, for securing said member in fixed telescoped position.

ARTHUR J. THOWLESS.